United States Patent
Kim et al.

(10) Patent No.: US 10,872,270 B2
(45) Date of Patent: Dec. 22, 2020

(54) EXPLOIT KIT DETECTION SYSTEM BASED ON THE NEURAL NETWORK USING IMAGE

(71) Applicant: SGA Solutions Co., Ltd., Seoul (KR)

(72) Inventors: Sung Jin Kim, Gyeonggi-do (KR); Seung Jae Kim, Gyeonggi-do (KR); Su Yeon Yoo, Daejeon (KR); Sung Kyu Kim, Seoul (KR); Soo Hwan Kim, Seoul (KR)

(73) Assignee: SGA Solutions Co., Ltd., Seoul (KR)

( * ) Notice: Subject to any disclaimer, the term of this patent is extended or adjusted under 35 U.S.C. 154(b) by 33 days.

(21) Appl. No.: 16/415,351

(22) Filed: May 17, 2019

(65) Prior Publication Data
US 2020/0285893 A1    Sep. 10, 2020

(30) Foreign Application Priority Data
Mar. 5, 2019   (KR) .......................... 10-2019-0025007

(51) Int. Cl.
*G06K 9/62*   (2006.01)
*G06T 3/40*   (2006.01)
(Continued)

(52) U.S. Cl.
CPC ......... *G06K 9/6256* (2013.01); *G06K 9/6267* (2013.01); *G06N 3/08* (2013.01);
(Continued)

(58) Field of Classification Search
CPC ...... G06K 9/6256; G06K 9/6267; G06N 3/08; G06T 3/40; G06T 7/90; G06T 2207/10024
See application file for complete search history.

(56) References Cited

U.S. PATENT DOCUMENTS 8,161,548 B1 *   4/2012   Wan .................. G06K 9/6228
                                                          726/22
2016/0337387 A1 *  11/2016  Hu ..................... G06F 16/2246
(Continued)

FOREIGN PATENT DOCUMENTS

KR        10-1611872 B1      4/2016

OTHER PUBLICATIONS

Liu, Liu, and Baosheng Wang. "Malware classification using grayscale images and ensemble learning." In 2016 3rd International Conference on Systems and Informatics (ICSAI), pp. 1018-1022. IEEE, 2016. (Year: 2016).*

(Continued)

*Primary Examiner* — Carol Wang
(74) *Attorney, Agent, or Firm* — Blank Rome LLP

(57) ABSTRACT

The present invention relates to an exploit kit detection system based on a neural network using an image and provides a configuration including: a file collection module for collecting a web file created in a web document code and a script code; a distribution module for distributing and storing the collected web file; a management module for assigning, when the web file is received, a job ID to the web file and registering the web file in an inspection target list; an image conversion module for converting a corresponding web file into grayscale, targeting the web file registered in the inspection target list; a classification model, as a classification model based on the neural network, for receiving an image of grayscale and classifying existence and a type of the exploit kit (EK); and a result processing module for receiving a classification result, creating a result data, and transmitting the result data to the distribution module.

According to the system as described above, as maliciousness of an image is determined by analyzing the image, an environment of detecting an exploit kit through only one (Continued)

conversion process is provided, and thus a fast performance can be demonstrated, and the system may be used for easy filtering of a malicious file from large-scale web page files.

10 Claims, 12 Drawing Sheets

(51) Int. Cl.
  *G06N 3/08* (2006.01)
  *G06T 7/90* (2017.01)
(52) U.S. Cl.
  CPC ............... *G06T 3/40* (2013.01); *G06T 7/90* (2017.01); *G06T 2207/10024* (2013.01)

(56) References Cited

U.S. PATENT DOCUMENTS

| | | | |
|---|---|---|---|
| 2017/0041332 A1* | 2/2017 | Mahjoub | H04L 43/0876 |
| 2018/0181752 A1* | 6/2018 | Guri | G06F 21/56 |
| 2019/0042745 A1* | 2/2019 | Chen | G06K 9/4628 |
| 2020/0244686 A1* | 7/2020 | Harris | G06F 16/9566 |

OTHER PUBLICATIONS

Yoo, Suyeon, Sungjin Kim, and Brent Byunghoon Kang. "The Image Game: Exploit Kit Detection Based on Recursive Convolutional Neural Networks." IEEE Access 8 (2020): 18808-18821. (Year: 2020).*

* cited by examiner

EXPLOIT KIT DETECTION SYSTEM BASED ON THE NEURAL NETWORK USING IMAGE

RELATED APPLICATION

This application claims the benefit to Korean Patent Application No. 10-2019-0025007, filed on Mar. 5, 2019. The entire content of this application is hereby incorporated by reference.

BACKGROUND OF THE INVENTION

Field of the Invention

The present invention relates to an exploit kit detection system based on a neural network using an image, which detects an exploit kit in a web on the basis of deep learning using grayscale image conversion, without using a specific extraction data (e.g., a JavaScript function name) extracted from the web.

Particularly, the present invention relates to an exploit kit detection system based on a neural network using an image, which collects a web file configured of a web document code (HTML or the like) and a script code, converts the collected file into an image, and determines maliciousness of the corresponding file by applying the converted image to a classifier of machine learning (deep learning).

In addition, the present invention relates to an exploit kit detection system based on a neural network using an image, in which a file size is measured and transferred to a classification model appropriate to a corresponding size when a web file is converted into an image and maliciousness is analyzed, and a size-specific classification model is an ensemble model, which is trained using a different training set according to the file size.

Background of the Related Art

Generally, an attacker should attack weak points of various applications installed in an infected user PC and acquire a right (use right) to distribute a malicious code through a web. The attacker inserts an attack script (exploit kit) in a web page and induces Internet connectors using the attack script to carry out the attack. The exploit kit (EK) is created in a web language and a script code (HTML/JavaScript code) inserted in a web server.

The prior art depends on an anti-virus technique using a pattern-based detection method or a machine learning technique based on text/script to detect an EK [Patent document 1]. That is, a conventional method detects an EK by analyzing features of a code, like the anti-virus technique of the prior art. For example, the conventional method analyzes a specific JavaScript function or a string pattern. Or, the conventional method executes an attack code through Java Script rendering, finds out an abnormal behavior or measures a risk level by analyzing various behavior log information generated at this point and determining existence of a suspicious DLL or API function, and determines maliciousness of a file.

That is, the existing method of detecting an exploit kit extracts a function name frequently used in the exploit kit and detects the exploit kit using a machine learning technique, or the method detects a signature (e.g., NB VIP) used by the exploit kit. However, when the exploit kit is configured of an obfuscated malicious code, these methods will be difficult to detect the exploit kit.

In addition, in the case of a general analysis system based on a virtual machine (VM), abnormal behaviors are analyzed through a debugging technique by using a JavaScript engine or training a web browser. However, in this case, it takes much time, and a problem of performance may occur in the system when a large number of web pages are analyzed or detected.

Accordingly, the method of detecting an exploit kit uses both a static analysis method and a dynamic analysis method. However, the two approaches has a problem of performance (detection rate and detection time). Even when an exploit kit is detected using a static analysis, it takes a considerable time since a variety of features should be extracted.

Particularly, an image-based deep learning (convolution neural network, CNN) technique may be used as a way of detecting a malicious code. However, when a packing technique frequently used by a malicious code is used, images of the malicious code are produced as images of the same type. Of course, although every packer has an image of the same type, it is difficult to tell a normal code from a malicious one since general users also use the same packer.

Accordingly, a CNN model may be applied after only an operation code (opcode) is extracted. However, this method also has a limit in the detection rate. Due to this limitation, there is a difficulty in an image detection-based analysis for analyzing a malicious code. However, an attack code (exploit kit) used to distribute a malicious code already exists in the form of an obfuscated code of a peculiar (distinguished) form. Accordingly, an image-based deep learning technique may be easily applied.

There are dozens of different exploit kit types on the Internet, and each exploit kit has various forms of attack code types. There are numerous variants in each type. Accordingly, currently existing exploit kits may be detected by training only (dozens of) attacking types (around 20 types) of each exploit kit. The number of attacking types is approximately around dozens of types×20. If different attack codes, as many as the number of attacking types (about 800), are trained, most of the exploit kits can be detected.

(Patent document 1) Korean Patent Registration No. 10-1611872 (Disclosed on Apr. 12, 2016)

SUMMARY OF THE INVENTION

Therefore, the present invention has been made in view of the above problems, and it is an object of the present invention to provide an exploit kit detection system based on a neural network using an image, which can detect an exploit kit (EK) without collecting behavior information through an attack code, which does not exist in a pattern rule, or through rendering, and provide an attack code detection framework which supports high detection rate and high detection performance. Particularly, the present invention detects an attack code using an image-based deep learning technique.

In addition, an object of the present invention is to provide an exploit kit detection system based on a neural network using an image, which determines maliciousness through a classifier based on machine learning, particularly using a convolution neural network (CNN) of the deep learning technique.

Particularly, an object of the present invention is to provide an exploit kit detection system based on a neural network using an image, which converts a web file into an image without separately extracting features, and downscales and sets a gray area to highlight the features.

In addition, an object of the present invention is to provide an exploit kit detection system based on a neural network using an image, which uses different classification models so that web files may be classified by the size to enhance the detection rate.

To accomplish the above objects, according to an aspect of the present invention, there is provided an exploit kit detection system based on a neural network using an image, the system including: a file collection module for collecting a web file created in a web document code and a script code; a distribution module for distributing and storing the collected web file; a management module for assigning, when the web file is received, a job ID to the web file and registering the web file in an inspection target list; an image conversion module for converting a corresponding web file into grayscale, targeting the web file registered in the inspection target list; a classification model, as a classification model based on the neural network, for receiving an image of grayscale and classifying existence and a type of the exploit kit (EK); and a result processing module for receiving a classification result, creating a result data, and transmitting the result data to the distribution module.

In addition, in the exploit kit detection system based on a neural network using an image, the image conversion module creates an image of the web file, converts the created image into grayscale, and downscales an image of the grayscale to convert the image into a final image.

In addition, in the exploit kit detection system based on a neural network using an image, the image conversion module sets a second scale of downscaling in a range smaller than a first scale of an initial grayscale.

In addition, the exploit kit detection system based on a neural network using an image further includes a file size processing module for determining a size type of the converted image, in which the classification model configures classification models different from each other in the size type of an image (hereinafter, a size-specific classification model), and the file size processing module determines a size type of the converted image, and transfers the converted image to a size-specific classification model corresponding to the determined size type.

In addition, in the exploit kit detection system based on a neural network using an image, the size-specific classification model is configured of a first classification model for processing an image of a small size, a second classification model for processing an image of a middle size, and a third classification model for processing an image of a large size, and the file size processing module sets in advance a first reference size and a second reference size such that the first reference size is smaller than the second reference size, determines an image as a small size if the image size is equal to or smaller than the first reference size, determines the image as a large size if the image size is equal to or larger than the second reference size, and determines the image as a middle size if the image size is larger than the first reference size and smaller than the second reference size.

In addition, in the exploit kit detection system based on a neural network using an image, the classification model is a model based on a convolution neural network (CNN).

In addition, in the exploit kit detection system based on a neural network using an image, the size-specific classification model is trained by a training set configured of images of a web file having a corresponding size type.

In addition, the exploit kit detection system based on a neural network using an image further includes a reporting module for creating and displaying a presentation data using the result data.

In addition, in the exploit kit detection system based on a neural network using an image, the reporting module further includes a dashboard module for creating and displaying a presentation data.

In addition, in the exploit kit detection system based on a neural network using an image, the image conversion module creates an image by recognizing a source code of the web file as a series of strings and converting a code value of each character of the strings into a pixel value of a color or gray.

In addition, in the exploit kit detection system based on a neural network using an image, the image conversion module creates an image by recognizing a source code of the web file as a series of strings and converting code values of three consecutive characters of the strings into a pixel value of a color.

In addition, the present invention relates to an exploit kit detection system based on a neural network using an image, the system including: a web file receiving unit for receiving a web file; an image conversion unit for converting the web file into an image; an EK classification unit for inputting the converted image into a classification model and classifying existence or a type of an EK of a corresponding web file; and a classification model training unit for training the classification model.

In addition, in the exploit kit detection system based on a neural network using an image, the image conversion unit creates the image by recognizing a source code of the web file as a series of strings and converting a code value of each character of the strings into a pixel value of a color or gray.

DETAILED DESCRIPTION OF THE PREFERRED EMBODIMENT

Hereinafter, details for embodying the present invention will be described with reference to the drawings.

In addition, in describing the present invention, like parts will be denoted by like symbols, and repeated decryptions thereof will be omitted.

First, the configuration of the entire system for embodying the present invention will be described with reference to FIG. 1.

Figure 1:
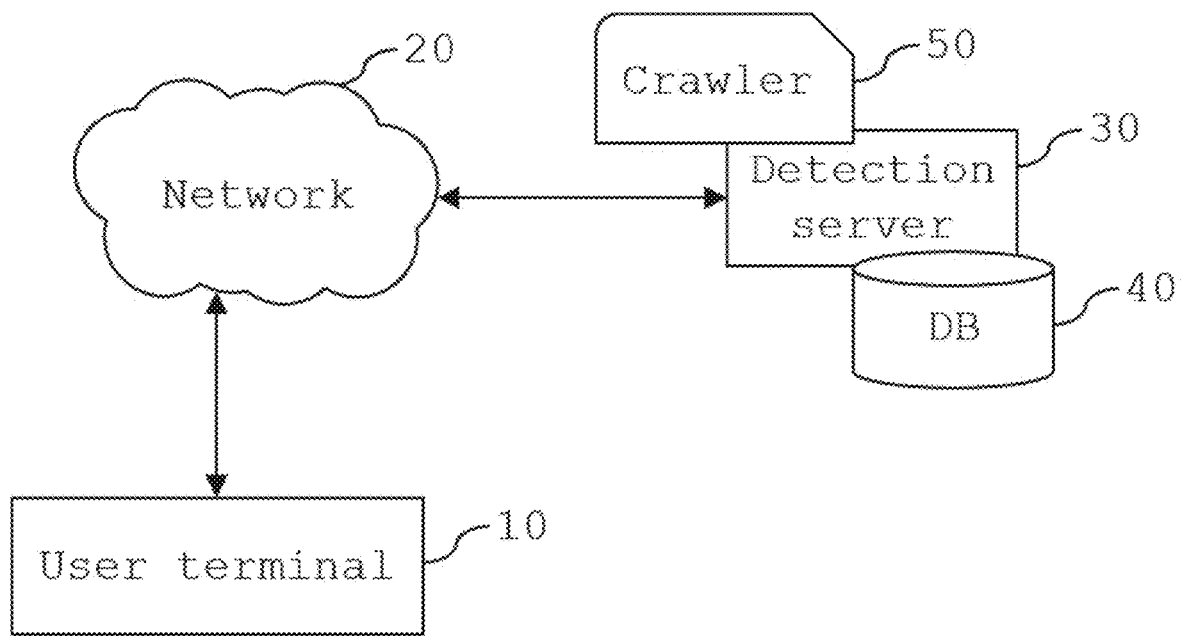
FIG. 1 is an exemplary view showing the configuration of the entire system for embodying the present invention.

As shown in FIG. 1, the entire system for embodying the present invention is configured of a user terminal 10 and a detection server 30 for detecting an exploit kit (EK). The user terminal 10 and the detection server 30 transmit and receive data through a network 20. Additionally, the system may be configured to further include a database 40 for storing data, and a crawler 50 for collecting web files on the Internet.

First, the user terminal 10 is a terminal used by a user to use a web service, which is a general computer terminal or a dedicated terminal having a computing function, such as a smart phone, a tablet PC, a notebook computer, a personal computer (PC) or the like.

The user terminal 10 collects web pages (or web files) viewed after connecting to a web server (not shown) and transmits the collected web files to the detection server 30.

In addition, the user terminal 10 may transmit a specific web page or web file to the detection server 30 and request to diagnose whether a corresponding web file is malicious.

A user performs a work through the user terminal 10. Accordingly, hereinafter, if a user performs a work, it means that the user performs the work using the user terminal 10.

Next, the crawler 50 automatically searches for and collects web files on the web of the Internet and transmits the collected web files to the detection server 30.

That is, the crawler 50 automatically collects web files targeting the web server on the web. The crawler 50 may be installed in the detection server 30 or provided separately (or as a separate server).

Next, the detection server 30 receives the collected web files from the user terminal 10 or the crawler 50 and detects an exploit kit (EK) included in a corresponding web file.

Specifically, the detection server 30 converts the received web file into an image of grayscale, downscales the converted image of grayscale, inputs the downscaled image into a classification model based on CNN, and detects an EK.

To identify an attack code (or EK), a value for identifying features of the attack code (EK) is needed. To this end, an analysis target file (or a web file) is converted into a gray image and used. At this point, machine learning is used. A training set is read in advance to train the classifier, and an EK is determined or classified using the trained classifier.

The detection server 30 may be expanded to a single system and a multi-system. That is, the single system is configured of components having a file collection module, a distribution module, a management module, an image conversion module, a file size measurement module, a classification model, a result processing module, a file repository (DB or big data platform), a reporting module and a dashboard module. The multi-system is configured of a plurality of these single systems.

Next, the configuration of an exploit kit (EK) detection system 30 according to a first embodiment of the present invention will be described with reference to FIG. 2.

Figure 2:
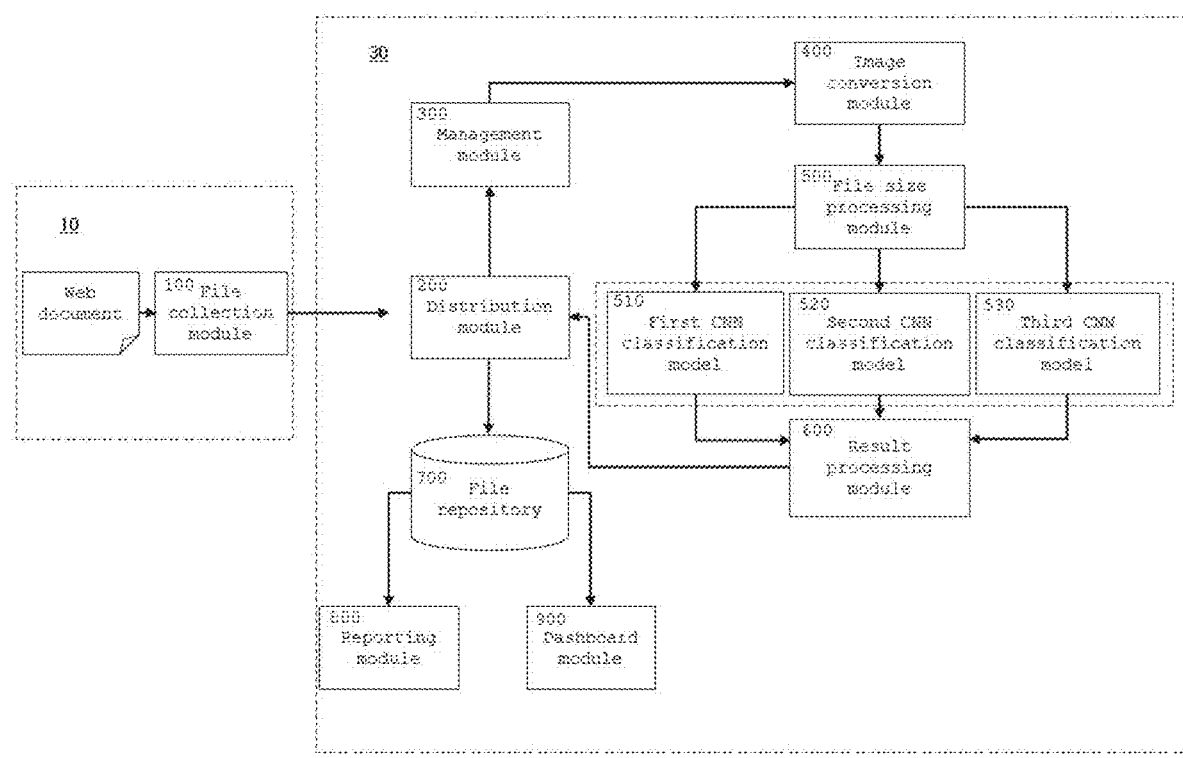
FIG. 2 is a block diagram showing the configuration of an exploit kit detection system based on a neural network using an image according to a first embodiment of the present invention.

As shown in FIG. 2, an EK detection system 30 according to a first embodiment of the present invention is configured of a file collection module 100 for collecting suspicious files requested by a user or collecting files through crawling, a distribution module 200 for determining whether a file requested to analyze is actually malicious, a management module 300, an image conversion module 400, a file size processing module 500, a first classification model 510, a second classification model 520, a third classification model 530, and a result processing module 600. Additionally, the EK detection system 30 may be configured to further include a file repository 700 for storing files, a reporting module 800 for reporting, and a dashboard module 900.

Meanwhile, the EK detection system 30 may be mounted and implemented in a virtual environment.

In addition, the distribution module 200 of the EK detection system 30 is configured as a separate single server and may be configured to sequentially respond to transmission requests of a plurality of mother modules and distribute analysis target files (suspicious files).

First, the file collection module 100 collects suspicious files requested by a user (or user terminal) or collects files crawled by the crawler 50. At this point, the collected files are web files configured of a web document code (HTML) and a script code (JavaScript).

The web document code is a code created in a web language such as HTML or the like, and the script code is a code created in a script language such as JavaScript or the like. That is, the web file is a web document code or a script code, or created from these codes.

In addition, when the file collection module 100 collects web files, it also collects file names of the web files. The web files collected at this time are files collected to classify maliciousness and also referred to as inspection target files.

In addition, the file collection module 100 transmits the collected web files and file names to the distribution module 200.

Preferably, the web files are transmitted using a data transmission platform (e.g., Kafka API or the like) provided by the distribution module 200. In addition, when the web files uploaded by a user or the crawler 50, the web files may be transmitted using another topic.

Next, the distribution module 200 manages or distributes the web files received from the file collection module 100 to be transferred to the management module 300 and the file repository 700.

That is, the distribution module 200 transmits the web files received from the file collection module 100 to the management module 300. A job ID is assigned to the web files transmitted to the management module 300, and a classification job is applied to the web files.

In addition, the distribution module 200 receives classified result data (result data created by the classification job) from the result processing module 600 and stores the result data in the file repository 700 as analysis target result processing information (data).

Next, the management module 300 sequentially creates a job ID (job index or job index ID) for the received web files using a file name, hash information and the like, assigns a job ID to a corresponding web file, and registers the web file in an inspection target list (inspection target files).

In addition, the management module 300 stores the analysis target files by the job ID on the basis of the web file received from the distribution module 200.

Then, the management module 300 transfers the analysis target file or the web file to the image conversion module 400.

Next, the image conversion module 400 receives the web file registered (in the inspection target list) by the management module 300, creates an image of the corresponding file, converts the corresponding file into grayscale, and downscales again the grayscale. That is, the image conversion module 400 reconverts the primarily converted value into grayscale having a color in a range of a downscaling size.

For example, when a web file is primarily converted into grayscale, it is divided into a scale of 256 levels, and when the grayscale is downscaled, it is divided into ten scale levels. That is, gray is divided into ten sections of {1-25, 26-50, 51-75, 76-100, 101-125, 126-150, 151-175, 176-200, 201-225, 226-255}. Grays belonging to the same section are regarded as the same gray (downscaling).

Preferably, the gray value belonging to a corresponding section is set as a representative value of the corresponding section. That is, gray values in the section of 1-25 are converted into representative value 1 of the section, and gray values in the section of 26-50 are converted into representative value 26 of the section.

As the gray values are limited by downscaling, image features may be highlighted furthermore. Particularly, when a deep learning model is used, the vanishing phenomenon of disappearing features is reduced.

At this point, the primary scale is referred to as a first scale, and a scale at the time of secondary downscaling is referred to as a second scale.

In addition, the image conversion module 400 transmits the image converted into grayscale (or grayscale image) to the file size processing module 500. That is, an image rendered by the image conversion module 400 is transmitted to the file size processing module 500.

Figure 3:
FIG. 3 a view showing an example image of a web file according an embodiment of the present invention.
Figure 4:
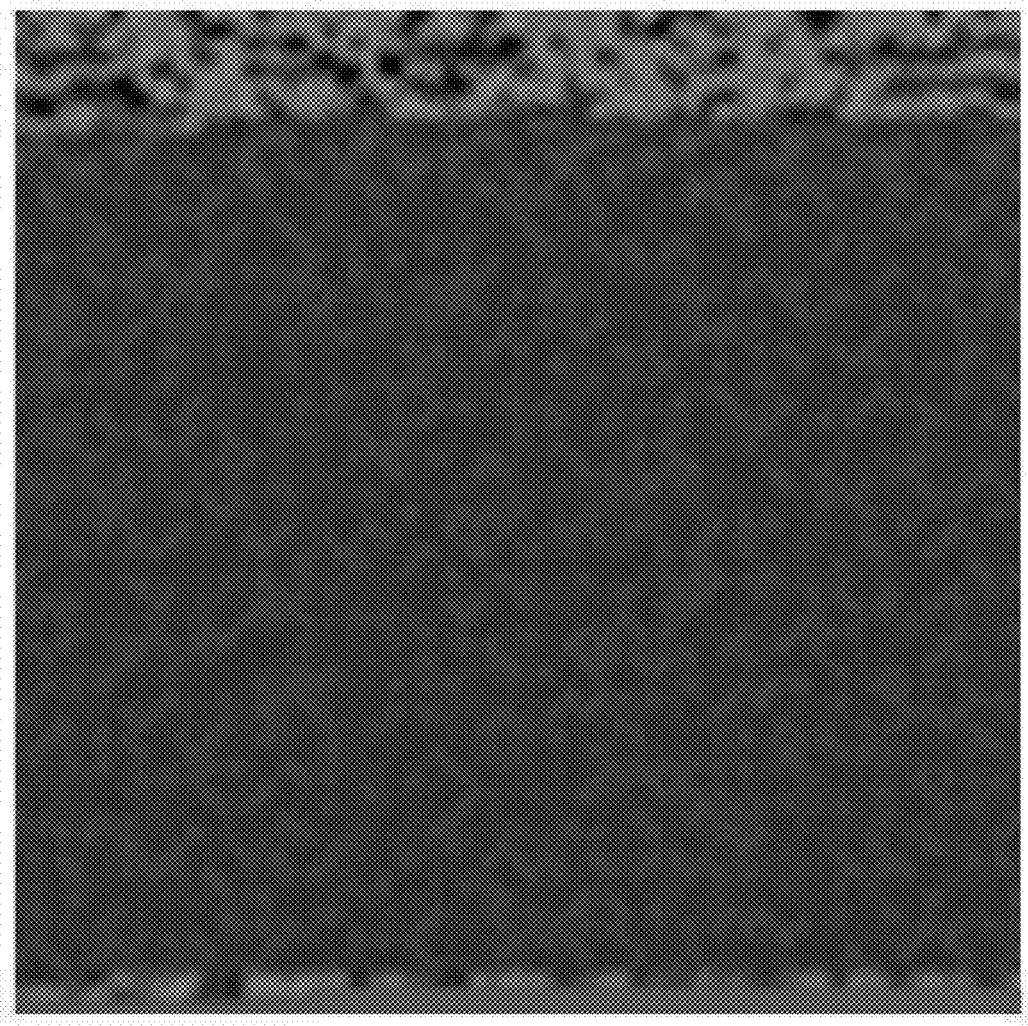
FIG. 4 is an exemplary view showing a converted grayscale image of a web file according to the present invention.
Figure 5A:
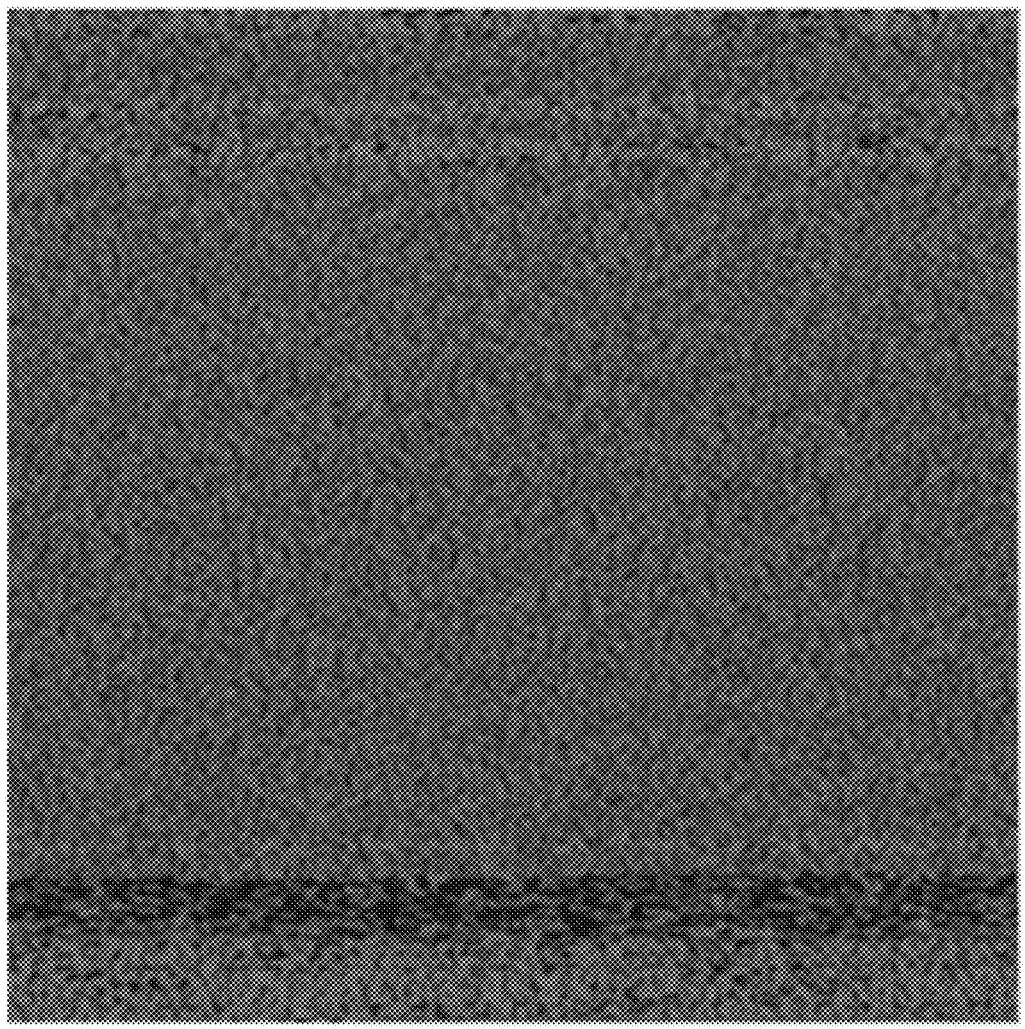
FIGS. 5(a)-5(f) are exemplary views showing grayscale images according to the present invention.
Figure 5B:
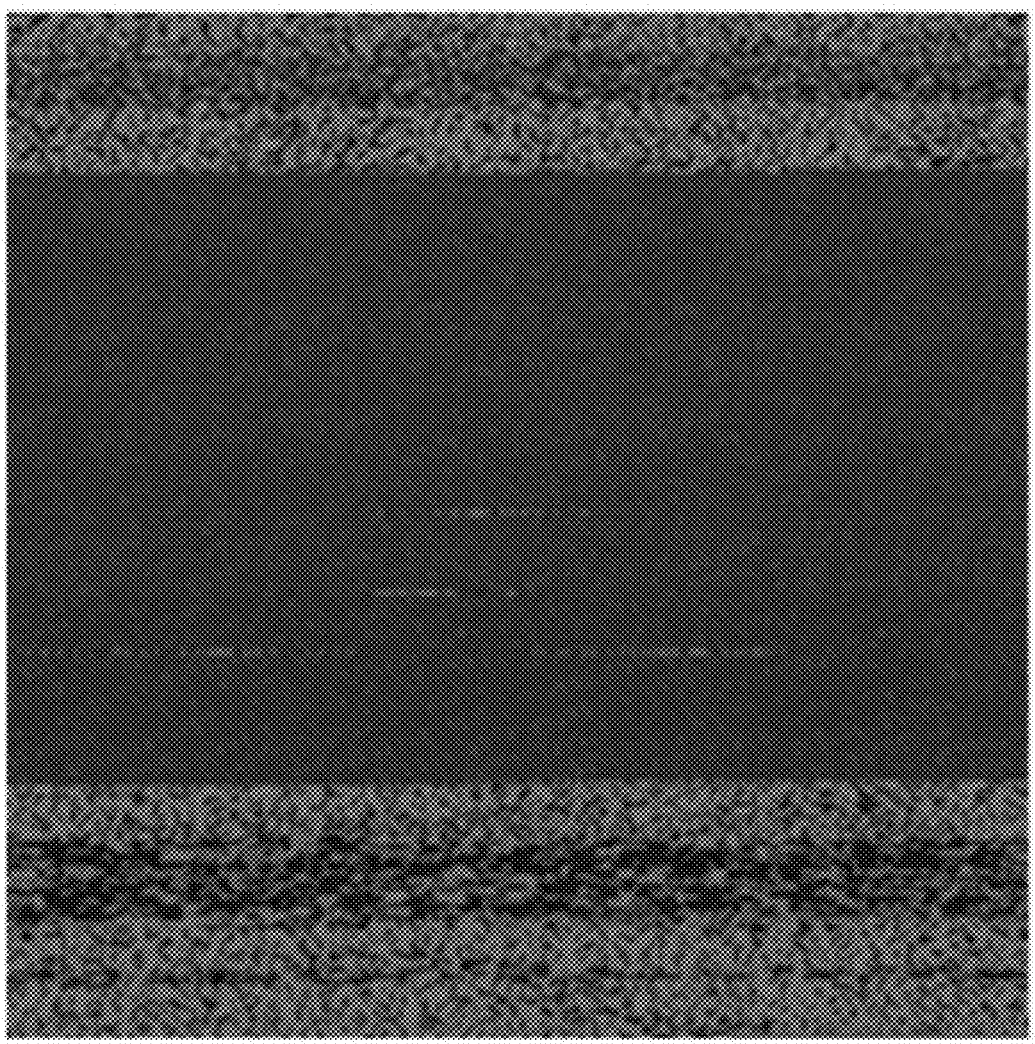
Figure 5C:
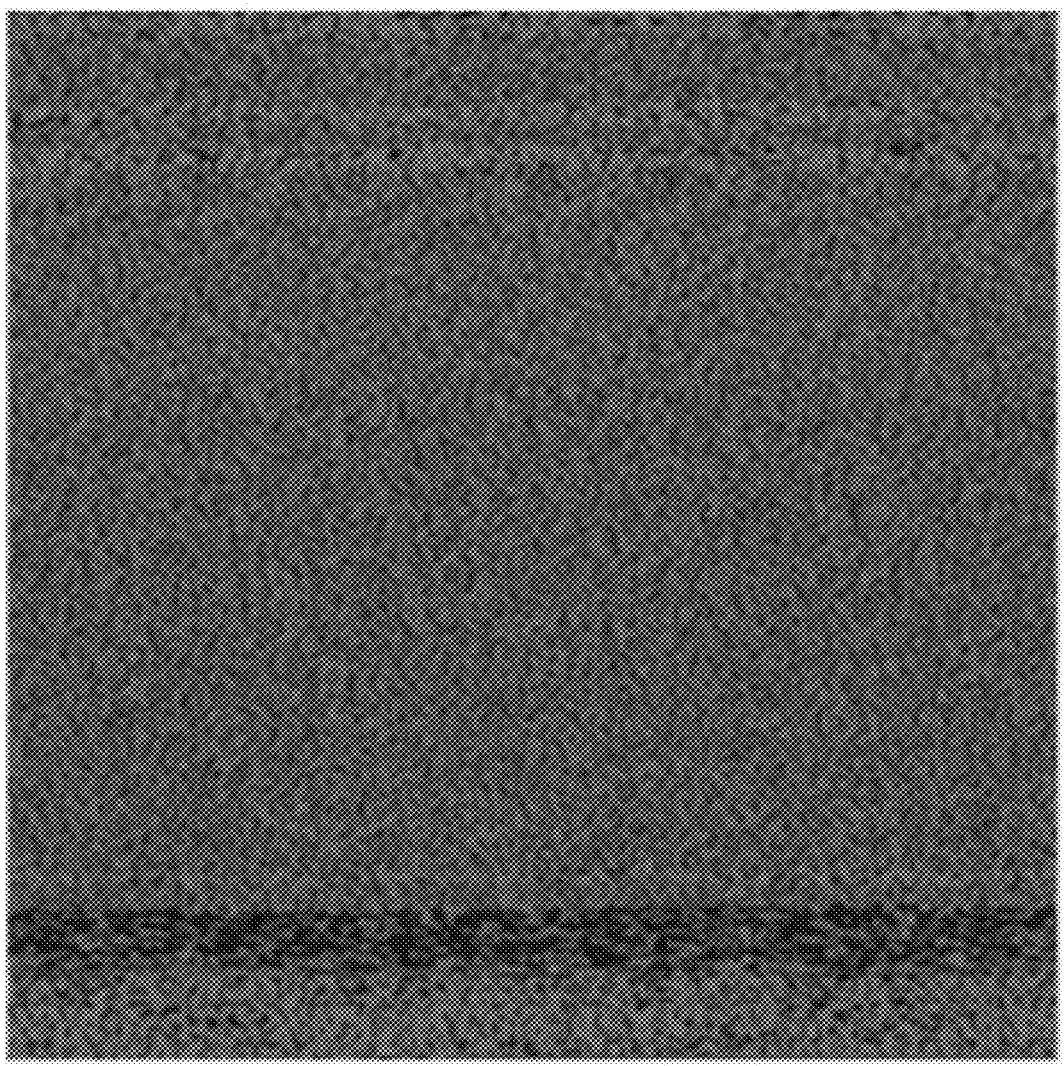
Figure 5D:
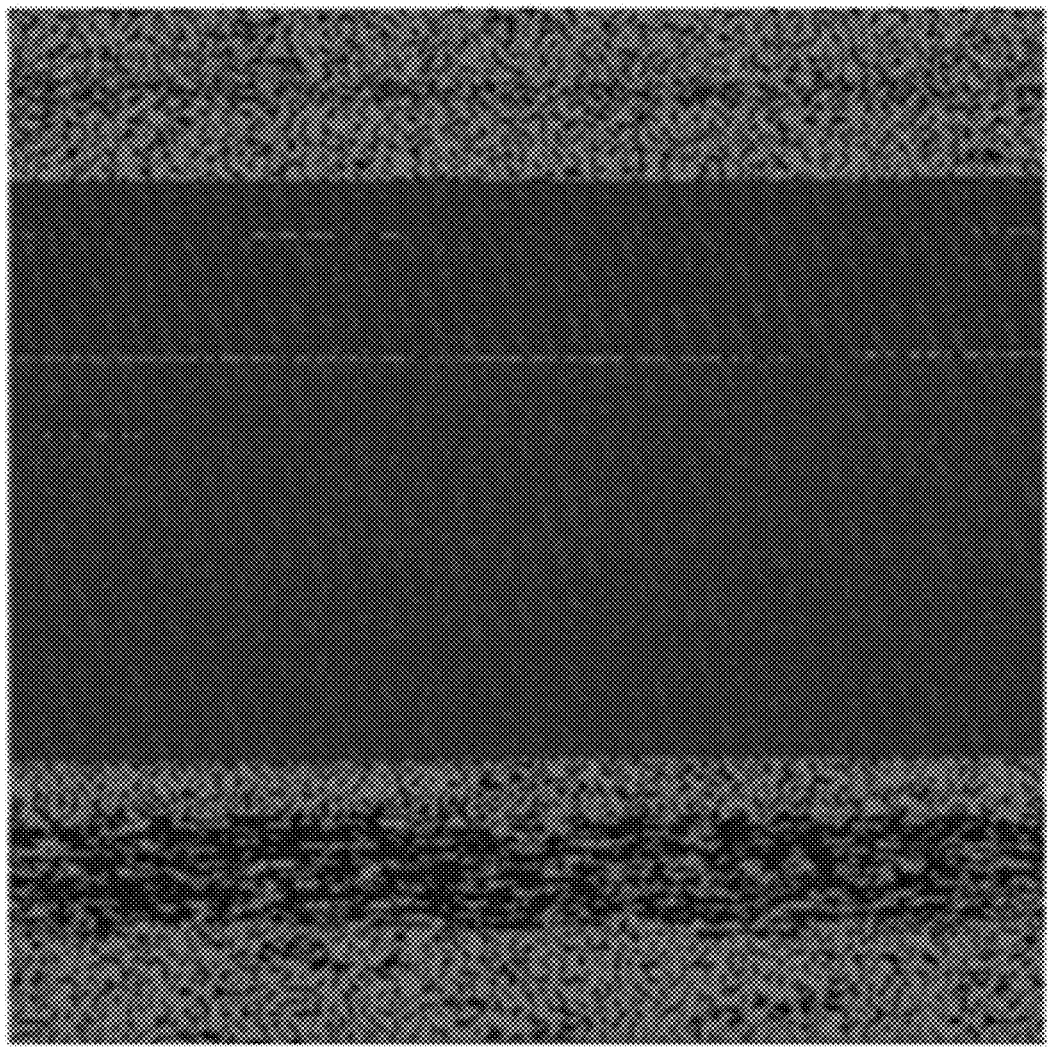
Figure 5E:
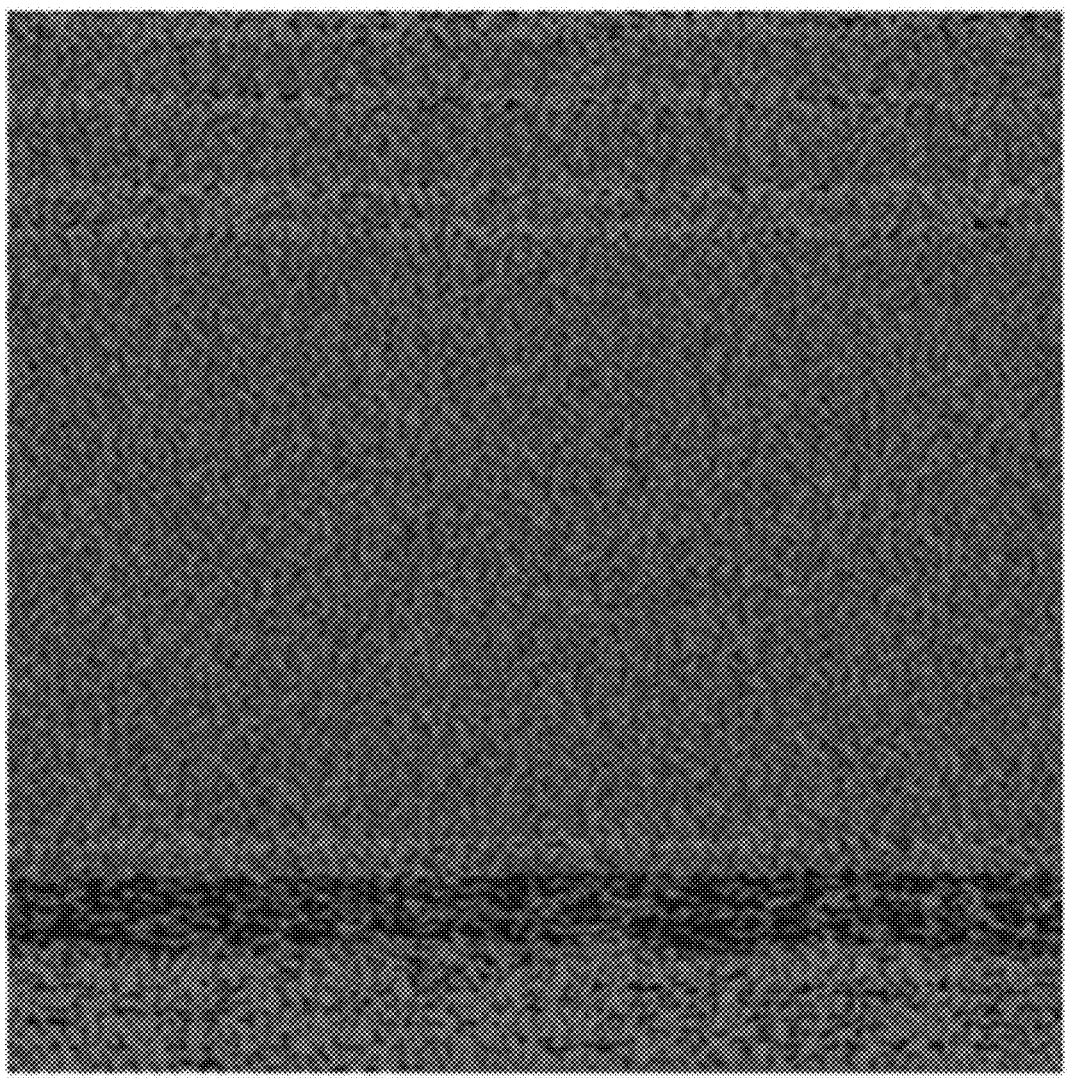
Figure 5F:
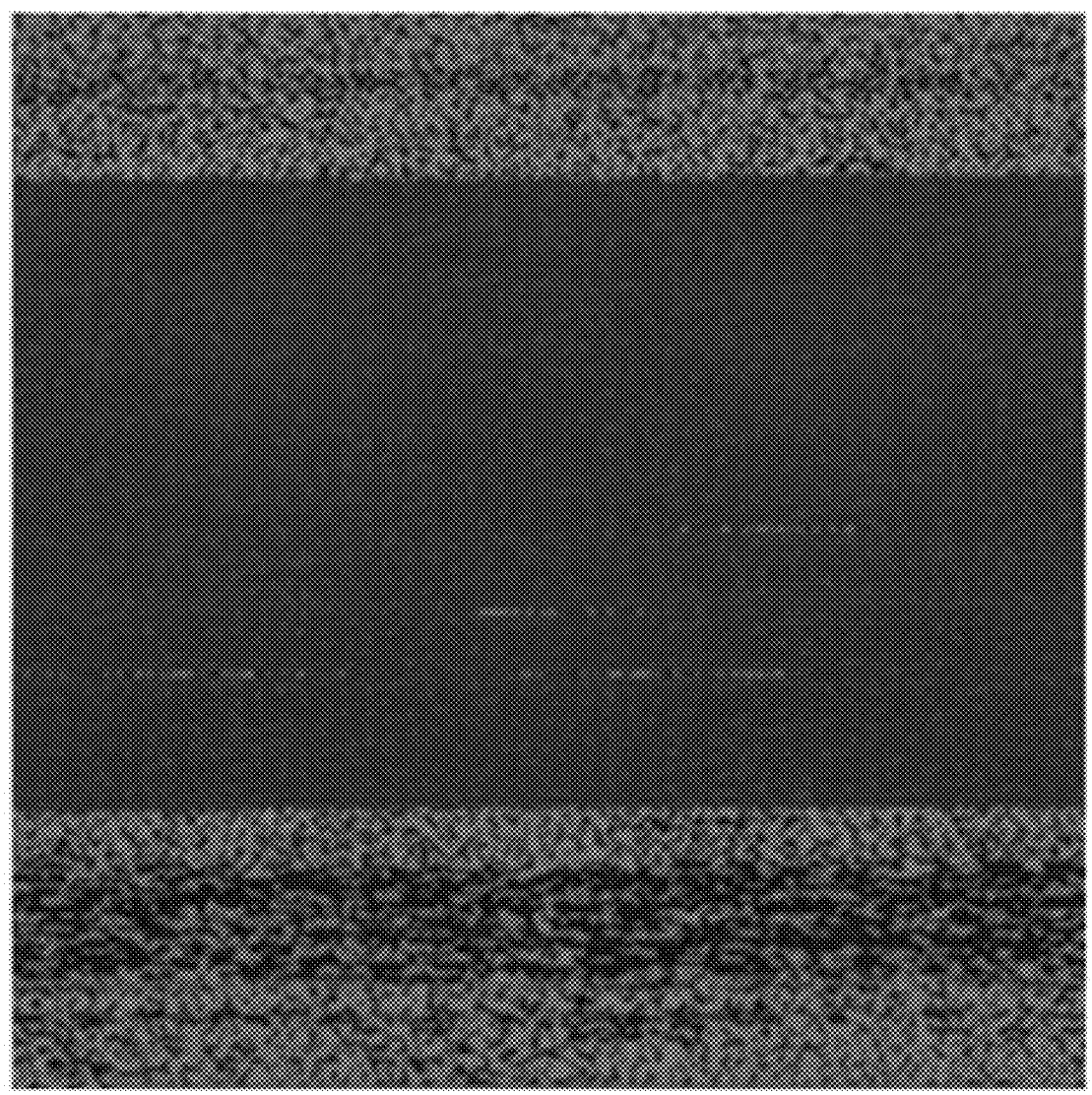

FIG. 3 shows an image of a web file, and FIG. 4 shows an image of a web file converted into grayscale.

Particularly, the image conversion module 400 recognizes the entire data (source code data) of the web file as a series of strings, converts a code value (e.g., ASCII code value or the like) of each character of the strings into a color data of a pixel, and creates a two-dimensional image (or a two-dimensional color image) by two-dimensionally arranging the converted color data (color pixels or pixels). Then, the image conversion module 400 converts the image into grayscale and downscales the converted grayscale. Preferably, the image conversion module 400 converts a code value of a character into an element of a color data. Accordingly, three consecutive character code values are creates as a color value (color data) of a pixel.

As another embodiment, the image conversion module 400 may immediately create a gray image by converting a code value of each character into a gray data of a pixel and downscale the created gray image.

That is, an attack source code is created as an HTML/JavaScript code and may be regarded as being in text format. The image conversion module 400 reads the text as strings, expresses each string (characters) as an element of a color (256 levels), and makes a color image of a size (e.g., 50×50) determined by a user.

Specifically, the image conversion module 400 reads the entire data of an HTML file and sequentially fetches three characters at a time from the front. Then, the image conversion module 400 changes each character to a hexadecimal digit (hex) and converts three hexadecimal values into a color data of a pixel.

For example, when a data of an HTML file is "HELLO WORLD", the image conversion module 400 reads first three bytes "HEL" and obtains "48 45 4C" by converting the characters into hexadecimal digits (hex).

An RGB value of a pixel needs three values. At this point, the RGB value of a pixel is set to be 48(R) 45(G) 4C(B).

Next, the image conversion module 400 converts the color data of each pixel into grayscale.

For example, a conversion equation as shown below may be used.

$$L = R \times 299/1000 + G \times 587/1000 + B \times 114/1000 \quad \text{[Equation 1]}$$

Here, L denotes a gray value, and R, G and B are color values, respectively.

The image conversion module 400 converts all the characters into grayscale while reading the characters one after another.

When a web file is converted into an image of an attack code, all the data such as invisible "whitespaces" and "carriage returns" in the HTML code may be converted into hexadecimal (hex) values. Accordingly, features of the forms of special characters, whitespaces and carriage returns in the code are maintained. Particularly, the converted image expresses well the features of the obfuscated attack code.

FIG. 5 shows an image of a web file originally including an EK and an image of the web file including a variant EK. That is, (a) and (b) of FIG. 5 show images including two different original EKs, (c) and (e) show variant EK images of (a), and (d) and (f) show variant EK images of (b).

As shown in FIG. 5, it is known that the image of a variant EK maintains features of the original EK image as they are.

Next, the file size processing module 500 measures a file size of a grayscale image, determines a size type, and transfers a corresponding image to a classification models 510, 520 or 530 of a corresponding size type according to the size type.

Preferably, the size type is classified into three types of a small size, a middle size and a large size. For example, if an image size is 1K bytes or smaller, the image is classified as a small size, if the image size is 100K bytes or larger, the image is classified as a large size, and if the image size is between 1K and 100K bytes, the image is classified as a middle size.

That is, a first reference size and a second reference size are determined in advance such that the first reference size is smaller than the second reference size, and the file size processing module determines the image as a small size if the image size is equal to or smaller than the first reference size, determines the image as a large size if the image size is equal to or larger than the second reference size, and determines the image as a middle size if the image size is larger than the first reference size and smaller than the second reference size.

The file size processing module 500 transfers the image to a first classification model 510 if the image is classified as a small size, to a second classification model 520 if the image is classified as a middle size, and to a third classification model 530 if the image is classified as a large size.

Next, the classification models 510, 520 and 530 are classifiers based on a neural network and classify maliciousness of a corresponding image when an image of grayscale is received. That is, the classification models 510, 520 and 530 classify existence and a type of an exploit kit (EK).

A classification models is classified according to a file size of an image. That is, the classification model is classified into three size types of a small size, a middle size and a large size.

Preferably, each of the classification models 510, 520 and 530 is a classification model based on a convolution neural network (CNN).

In addition, a classified result of the classification models 510, 520 and 530, i.e., maliciousness of a corresponding image, is transmitted to the result processing module 600.

The classification models 510, 520 and 530 have learning data (or training sets) different from each other. Each training set is built using a normal image or a malicious image file having a similar size.

A general attack code grayscale image has image forms of a limited number. For example, in the case of an angler exploit kit, the number of images of an angler type is around ten. About ten different types of images exist. Numerous variant images exist in each type. Accordingly, the training data used for detecting an angler are numerous variants of ten types. In addition to the angler, dozens of different types of exploit kits exist. Different types exist in each exploit kit. The image file having a distinguished type is classified into a size of three sections and trained.

Image information is classified into normal and malicious through a CNN model. Particularly, a CNN classification model used for detection is configured as a neural network having a plurality of layers (Convolution, Convolution, Max pooling, dropout, Convolution, Convolution, Max pooling, dropout, Flatten, and softmax). The classification model has two large convolution layers (Convolution, Convolution, Max pooling, dropout).

Each of the classification models 510, 520 and 530 is a model having a basic structure as described above. Each of the classification models 510, 520 and 530 has a learning data (training set) of a different size. When there is an inspection target file, image conversion is performed, and the file is inputted into a trained classifier and analyzed (classified) according to the size of the corresponding file. As a result of the classification, maliciousness is finally determined.

That is, each of the classification models 510, 520 and 530 has a weight value trained using the learning data (training set) having files of the same size.

The first classification model 510 has a weight value trained using a set having a normal code and an attack code of a web document/script (HTML/JavaScript) of a small size. In addition, when there is a classification request on an image file of a small size, the first classification model 510 classifies maliciousness of the corresponding file. The second classification model 520 has a weight value trained by a set having a web file of a web document/script (HTML/JavaScript) of a middle size. In addition, the third classification model 530 has a weight value trained by a set having a web file of a large size.

In addition, the classification models 510, 520 and 530 receive an input of an image and output a classification result information. Preferably, the result information may be outputted as maliciousness information, 1 or 0, or a probability (%) of maliciousness. That is, maliciousness is expressed as a value between 0 and 1.

Next, the result processing module receives the classification result (maliciousness, or existence or a type of EK) from the classification models 510, 520 and 530, creates a result data, and transmits the result data to the distribution module 200.

At this point, the result data is configured of maliciousness, a name (or type) of an exploit kit (EK), an analysis time, a file hash value, a file name, a job ID, meta-information and the like.

In addition, the data and the (maliciousness) result created in the analysis process through the result processing module 600 are formatted in a JSON type and transmitted to the distribution module 200 thereafter.

Next, the reporting module 800 collects detection information and information on the analysis content, creates a presentation data from corresponding information, and displays the created data.

That is, the reporting module 800 creates a reporting document from an image collection data, including an analysis time, a name of an analysis target file, a job ID, a file path, hash and meta-data, and a processing result data of the corresponding file.

Particularly, the reporting module 800 summarizes various kinds of analysis information collected on the basis of time stamp. Particularly, the analysis information includes an analysis time, processing result information, image-related meta-information and the like.

Preferably, the reporting module 800 may be provided with the dashboard module 900 for creating and displaying presentation data.

In addition, the reporting module 800 provides a storage space and an interface for searching for result information (file meta-information, detection information, etc.) stored in the DB. In addition, the reporting module 800 acquires statistic values of the result by performing a statistical process on the result information.

Next, an exploit kit (EK) detection method of the EK detection system 30 according to a first embodiment of the present invention will be described with reference to FIG. 6.

The method according to the present invention is executed by the EK detection system 30 and detects an attack code (or an exploit kit) hidden in a web used in advance to distribute a malicious code or determines maliciousness targeting a collected web file (or an HTML/JavaScript file).

Figure 6:
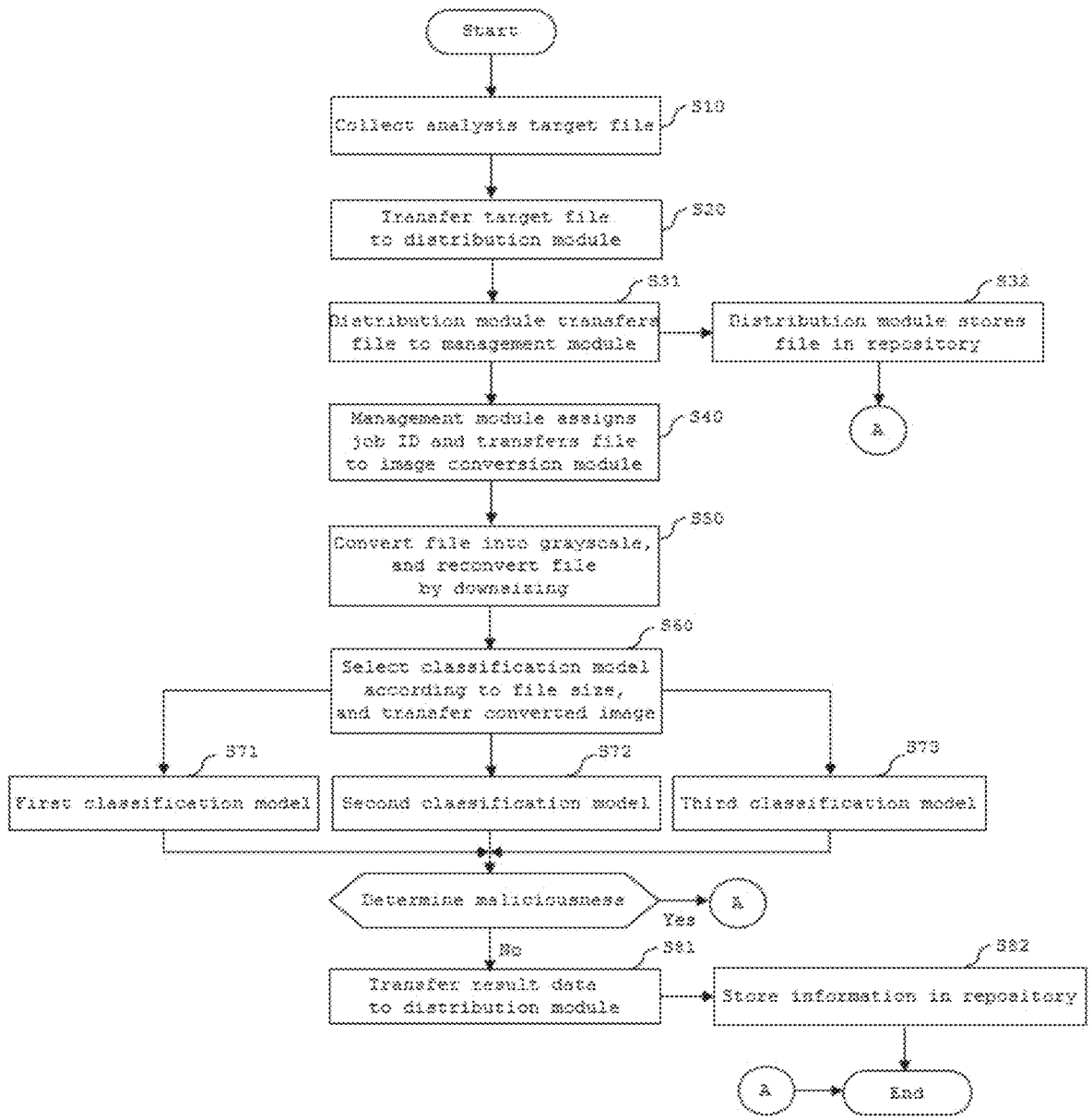
FIG. 6 is a flowchart illustrating an exploit kit detection method based on a neural network using an image according to a first embodiment of the present invention.

As shown in FIG. 6, first, if the file collection module 100 collects or an individual user uploads a web file (HTML/JavaScript file) (step S10), the file collection module 100 transmits the web file to the distribution module 200 (step S20).

If the file collection module 100 transmits the web file to the distribution module 200 using an API, the distribution module 200 transmits the corresponding file to the management module 300 (step S31) and stores the file in the file repository 700 (step S32).

Next, the management module 300 sequentially creates a job ID and transmits the corresponding file to the image conversion module 400 (step S40).

Next, the image conversion module 400 converts an original image into grayscale and re-converts the converted grayscale by downscaling the grayscale into grayscale having a limited range (step S50). The downscaling conversion is used to highlight features by limiting the number of gray ranges.

Next, the file size processing module 500 measures a file size and transmits, on the basis of the file size, a corresponding size to a model trained in advance (step S60). Particularly, the image is transmitted to a corresponding classification model on the basis of the size.

Next, each of the classification models 510, 520 and 530 classifies maliciousness of the received image through the CNN model (steps S71, S72 and S73).

Next, these results are transmitted through the result processing module 600, and if the distribution module 200 receives the results (step S81), the distribution module 200 stores the received information in the file repository 700 (step S82).

Meanwhile, the reporting module 800 provides summary information on the maliciousness information detected through a machine learning model and provides EK analysis information by timestamp.

Particularly, the dashboard module 900 may provide an interface to search for data through the file repository 700, in addition to the information provided through the reporting module 800. That is, the dashboard module 900 performs various statistical processes on the collected information and visualizes a result thereof. The dashboard module 900 also includes a reporting function.

Next, the configuration of an exploit kit (EK) detection system 30 according to a second embodiment of the present invention will be described with reference to FIG. 7.

The EK detection system 30 according to a second embodiment may be implemented as a server on a network, a computer program on a computer terminal, a dedicated terminal, or a dedicated circuit such as ASIC.

Figure 7:
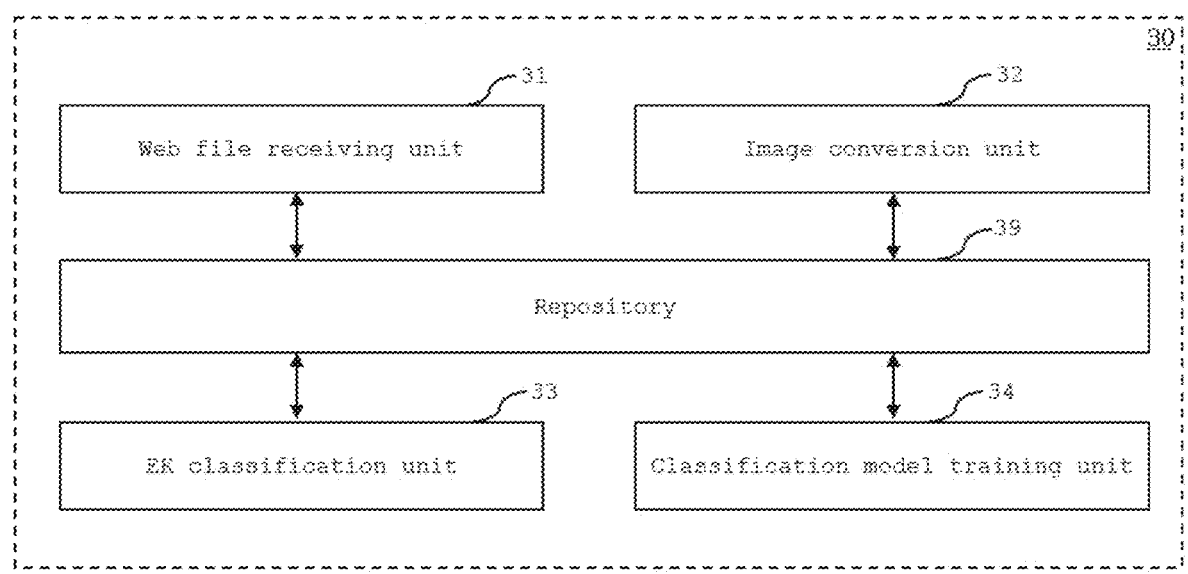
FIG. 7 is a block diagram showing the configuration of an exploit kit detection system based on a neural network using an image according to a second embodiment of the present invention.

As shown in FIG. 7, the exploit kit (EK) detection system 30 according to a second embodiment of the present invention is configured of a web file receiving unit 31 for receiving a web file, an image conversion unit 32 for converting the web file into an image, an EK classification unit 33 for inputting the converted image into a classification model and classifying existence or a type of an EK of the corresponding web file, and a classification model training unit 34 for training the classification model.

First, the web file receiving unit 31 receives a web file created in a web document code and a script code.

Next, the image conversion unit 32 converts the web file into an image. That is, the image conversion unit 32 creates an image of the web file, converts the created image into grayscale, and downscales the image of grayscale to convert the image into a final image.

In addition, the image conversion unit 32 creates a grayscale image by recognizing the source code of the web file as a series of strings and converting a code value of each character of the strings into a pixel value of a color. Particularly, the image conversion unit 32 converts code values of three consecutive characters of the strings into a pixel value of a color.

Alternatively, as another embodiment, the image conversion unit 32 may create a grayscale image by recognizing the source code of the web file as a series of strings and directly converting a code value of each character of the strings into a pixel value of gray.

Next, the EK classification unit 33 inputs the converted image into a classification model and classifies existence or a type of an EK of a corresponding web file.

Next, the classification model training unit 34 trains the classification model using a training set.

As described above, according to the exploit kit detection system based on a neural network using an image according to the present invention, as maliciousness of an image is determined by analyzing the image, an environment of detecting an exploit kit through only one conversion process is provided, and thus a fast performance can be demonstrated, and there is an effect of easily filtering a malicious file from large-scale web page files.

In addition, according to the exploit kit detection system based on a neural network using an image according to the present invention, as a different classification model is configured for the files of the same size, there is an effect of further enhancing the detection rate compared with a case of detecting images of different sizes using the same classification model.

Accordingly, compared with an existing pattern-based detection method, the present invention may provide a high detection rate and a fast detection performance and may help detecting a malicious web page which distributes a malicious code.

In addition, the present invention may speedily analyze maliciousness of a plurality of HTML files collected through crawling, in addition to a single user, and promptly grasp a malicious attack code hidden in a network distributing malicious codes.

In addition, if the present invention is implemented as a central management system, many user PCs infected by a malicious code through a web attack can be protected and managed. The present invention may protect propagation of malicious codes in advance beyond the limit of a pattern-based detection method, find out malicious web pages, and eventually implement an analysis system for preventing propagation of malicious codes of various forms flowing into the user PCs.

In addition, in addition to the function of simply classifying attack codes, the present invention may be used as a pattern in an anti-virus system or may be switched to an IoC type to be used in and applied to other similar systems used for detecting malicious tools.

The conventional EK detection technique detects an attack code through machine learning by using features of the attack code (e.g., a script function name, and a signature in the attack code), a file size, and the number of lines as features. Alternately, the conventional technique detects an attack code through pattern matching. However, it takes a lot of time in finding a pattern or collecting the features. That is, the process of reading an attack code and extracting features consumes a considerable time. On the contrary, since the present invention detects an attack code by converting the attack code into an image, only a very short time is consumed, and the detection speed is very high.

In addition, according to the conventional technique, when an attack code is obfuscated, the features are difficult to extract. However, since a used image itself is a feature in the present invention, there is no constraint. A converted image shows well the features of the attack code. In addition, a downscaled image implies more features than 256 grays or RGB and shows well features of the code.

While the present invention invented by the inventor has been described in detail according to the embodiments, the present invention is not limited to the embodiments but can be changed diversely within a scope not departing from the spirit of the present invention.

[Research Project Related to the Invention]
Project Identification Number: 2017-0-00265
Government Department: Ministry of Science and ICT
Specialized Organizations for Research Management: Institute of Information & Communications Technology Planning & Evaluation
Research Project Name: Development of Source Technology of SW Computing Industry
Research Item Name SDR Security Platform for APT Attack Detection and Response based on AI and Big Data
Main Organization: SGA Solutions Co., Ltd
Research Period: Apr. 1, 2017-Mar. 31, 2019

What is claimed is:

1. An exploit kit detection system based on a neural network using an image, the system comprising:
    a file collection module for collecting a web file created in a web document code and a script code;
    a distribution module for distributing and storing the collected web file;
    a management module for assigning, when the web file is received, a job ID to the web file and registering the web file in an inspection target list;
    an image conversion module for converting a corresponding web file into a grayscale image, targeting the web file registered in the inspection target list;
    a classification model, as a classification model based on the neural network, for receiving the grayscale image and classifying an existence and a type of the exploit kit (EK); and
    a result processing module for receiving a classification result, creating a result data, and transmitting the result data to the distribution module.

2. The system according to claim 1, wherein the image conversion module creates an image of the web file, converts the created image into a grayscale image of the web file, and downscales the grayscale image of the web file to convert the image of the web file into a final image.

3. The system according to claim 2, wherein the image conversion module creates an image by recognizing a source code of the web file as a series of strings and converting a code value of each character of the strings into a pixel value of a color or gray.

4. The system according to claim 2, wherein the image conversion module creates an image by recognizing a source code of the web file as a series of strings and converting code values of three consecutive characters of the strings into a pixel value of a color.

5. The system according to claim 1, further comprising a file size processing module for determining a size type of the grayscale image, wherein the classification model configures classification models different from each other based on a size type of an image, and the file size processing module determines the size type of the grayscale image, and transfers the grayscale image to a size-specific classification model corresponding to the determined size type.

6. The system according to claim 5, wherein the size-specific classification model is configured with a first classification model for processing an image of a small size, a second classification model for processing an image of a middle size, and a third classification model for processing an image of a large size, and the file size processing module sets in advance a first reference size and a second reference size such that the first reference size is smaller than the second reference size, determines a specific image as a small size if an image size of the specific image is equal to or smaller than the first reference size, determines the specific image as a large size if the image size is equal to or larger than the second reference size, and determines the specific image as a middle size if the image size is larger than the first reference size and smaller than the second reference size.

7. The system according to claim 5, wherein the classification model is a model based on a convolution neural network (CNN).

8. The system according to claim 1, further comprising a reporting module for creating and displaying a presentation data using the result data.

9. An exploit kit detection system based on a neural network using an image, the system comprising:
    a web file receiving unit for receiving a web file;
    an image conversion unit for converting the web file into a grayscale image;
    an EK classification unit for inputting the grayscale image into a classification model and classifying an existence and a type of an EK of a corresponding web file; and
    a classification model training unit for training the classification model.

10. The system according to claim 9, wherein the image conversion unit creates the image by recognizing a source code of the web file as a series of strings and converting a code value of each character of the strings into a pixel value of a color or gray.

* * * * *